(12) United States Patent
Koganehira et al.

(10) Patent No.: US 8,105,427 B2
(45) Date of Patent: Jan. 31, 2012

(54) INK COMPOSITION FOR INK JET RECORDING

(75) Inventors: Shuichi Koganehira, Matsumoto (JP);
Masashi Kamibayashi, Matsumoto (JP);
Hironori Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 80 days.

(21) Appl. No.: 12/569,948

(22) Filed: Sep. 30, 2009

(65) Prior Publication Data

US 2010/0087595 A1   Apr. 8, 2010

(30) Foreign Application Priority Data

Sep. 30, 2008 (JP) ................................. 2008-255465
Aug. 20, 2009 (JP) ................................. 2009-191343

(51) Int. Cl.
*C09D 11/02* (2006.01)

(52) U.S. Cl. ............... 106/31.58; 106/31.59; 106/31.86; 106/31.89

(58) Field of Classification Search ............... 106/31.58, 106/31.59, 31.86, 31.89
See application file for complete search history.

(56) References Cited

U.S. PATENT DOCUMENTS

| | | | |
|---|---|---|---|
| 6,554,891 B1 | 4/2003 | Momose et al. | |
| 6,715,868 B2 | 4/2004 | Schmidt et al. | |
| 7,332,023 B2 | 2/2008 | Rehman et al. | |
| 7,553,360 B2 * | 6/2009 | Koganehira et al. | 106/31.58 |
| 2004/0180970 A1 | 9/2004 | Kretz et al. | |
| 2007/0242118 A1 * | 10/2007 | Koganehira et al. | 106/31.86 |
| 2007/0247504 A1 | 10/2007 | Koganehira et al. | |
| 2007/0256593 A1 | 11/2007 | Koike et al. | |
| 2009/0176071 A1 * | 7/2009 | Koganehira et al. | 427/288 |
| 2009/0297716 A1 * | 12/2009 | Koganehira et al. | 427/288 |
| 2009/0308279 A1 * | 12/2009 | Koganehira et al. | 106/31.13 |
| 2010/0010121 A1 * | 1/2010 | Koganehira et al. | 524/90 |
| 2010/0080962 A1 * | 4/2010 | Koganehira et al. | 106/31.6 |
| 2010/0086685 A1 * | 4/2010 | Mizutani et al. | 427/256 |
| 2010/0289848 A1 * | 11/2010 | Koganehira et al. | 347/100 |

FOREIGN PATENT DOCUMENTS

| | | |
|---|---|---|
| JP | 2003-213179 A | 7/2003 |
| JP | 2003-253167 | 9/2003 |
| JP | 2004-526019 | 8/2004 |
| JP | 2004-277424 A | 10/2004 |
| JP | 2005-194500 | 7/2005 |
| JP | 2006-249429 | 9/2006 |
| JP | 2007-277342 | 10/2007 |
| JP | 2007-277342 A | 10/2007 |
| JP | 2007-277361 A | 9/2009 |
| JP | 2009-209338 | 9/2009 |
| JP | 2009-209339 | 9/2009 |
| JP | 2009-209340 | 9/2009 |
| WO | 00-71628 A | 11/2000 |

OTHER PUBLICATIONS

English Patent Abstract of Japanese Publication No. 2009-209340 Published Sep. 17, 2009.
English Patent Abstract of Japanese Publication No. 2009-209339 Published Sep. 17, 2009.
English Patent Abstract of Japanese Publication No. 2009-209338 Published Sep. 17, 2009.
English Patent Abstract of Japanese Publication No. 2003-213179A Published Jul. 30, 2003.
English Patent Abstract of Japanese Publication No. 2003-253167 Published Sep. 10, 2003.
English Patent Abstract of Japanese Publication No. 2005-194500 Published Jul. 21, 2005.
English Patent Abstract of Japanese Publication No. 2006-249429 Published Sep. 21, 2003.

* cited by examiner

*Primary Examiner* — Helene Klemanski
(74) *Attorney, Agent, or Firm* — Ladas & Parry LLP

(57) ABSTRACT

An ink composition that can form a high-quality image free from bleeding or beading even on printing paper or off-set printing paper such as art paper, in particular, even in a case of low-resolution printing, and is excellent in the property of recovering from clogging even after having been left under environment of high temperature and low humidity. The ink composition for ink jet recording includes at least a coloring material, water, a slightly water-soluble alkanediol, and a polyalkylene glycol.

23 Claims, No Drawings

INK COMPOSITION FOR INK JET RECORDING

CROSS-REFERENCES TO RELATED APPLICATIONS

The entire disclosure of Japanese Patent Application No. 2008-255465, filed on Sep. 30, 2008, No. 2009-191343, filed on Aug. 20, 2009, are expressly incorporated by reference herein.

FIELD OF THE INVENTION

The present invention relates to an ink composition for ink jet recording that can provide a high-quality recorded matter on various recording media, especially, even on a recording medium having a low ink-absorbing property, such as synthetic paper or printing paper or off-set printing paper.

BACKGROUND OF THE INVENTION

An ink jet recording method is a printing process for printing by letting ink droplets fly and attach to a recording medium such as paper. According to recent innovative progress in ink jet recording technology, the ink jet recording method has been also used in the field of highly fine printing that was achieved by silver halide photography or offset printing before. With this, an ink for ink jet recording has been developed so that an image having glossiness being similar to that achieved by silver halide photography can be formed by the ink jet recording on so-called exclusive paper, which is a recording medium having high gloss being equal to that of photographic paper or art paper used in the fields of silver halide photography and offset printing. In addition, ink for ink jet recording that can achieve image quality, even on plain paper, being similar to that achieved by silver halide photography has been developed.

Incidentally, desk top publishing (DTP) has been spreading in recent years, in particular, in the printing field, with the wide spreading of a technology for forming an image from digital data. Even when printing is carried out by DTP, a proof for color proofing is preliminarily prepared in order to confirm the glossiness and color impression of the actual printed matter. The ink jet recording system is applied to the output of the proof, and exclusive paper for ink jet recording is usually used as the recording medium since high color reproducibility and high color stability of the printed matter are required in the DTP.

A proof sheet, which is exclusive paper for ink jet recording, is produced so as to exhibit glossiness and color impression similar to those of the actual output printed on printing paper or off-set printing paper. Thus, the material of the exclusive paper is properly adjusted depending on the type of printing paper or off-set printing paper. However, production of exclusive paper that can respond to all of the various types of printing paper or off-set printing paper causes an increase in manufacturing cost. Accordingly, in application to color proofing, it is desired, in the technical viewpoint, to conduct ink jet recording on printing paper or off-set printing paper rather than on exclusive paper. Furthermore, if it is possible to conduct ink jet recording directly on printing paper or off-set printing paper, not on exclusive paper, for providing a final proof sample, which can significantly decrease the cost for proof and therefore is desired in the economical viewpoint. In addition, synthetic paper prepared by mixing an inorganic filler and the like with a polyethylene resin or a polyester resin and then forming the mixture into a film is widely used in the printing field. The synthetic paper is excellent in recyclability and thereby has recently received widespread attention as an environment-friendly material. It is desired to record on such synthetic paper, from the environmental viewpoint.

The printing paper or off-set printing paper is coated paper having a coating layer on the surface for receiving oil-based ink and has a characteristic that the coating layer is poor in ink-absorbing ability against aqueous ink. Therefore, in the use of aqueous pigment ink, which is usually used in ink jet recording, bleeding or beading unevenness may occur in an image because of low permeability of the ink into the recording medium (printing paper or off-set printing paper).

Against the above-mentioned problems, for example, JP-A-2005-194500 (Patent Document 1) discloses a pigment ink that is decreased in bleeding and also is excellent in gloss to exclusive paper by including a polysiloxane compound as a surfactant and an alkanediol, such as 1,2-hexanediol, as a solubilization aid. In addition, JP-A-2003-213179 (Patent Document 2), JP-A-2003-253167 (Patent Document 3), or JP-A-2006-249429 (Patent Document 4) proposes that permeability of ink into a recording medium is controlled by adding a diol such as glycerin or 1,3-butanediol or a triol alcohol solvent such as pentanetriol to the ink for forming a high-quality image.

RELATED ART

[Patent Document 1] JP-A-2005-194500
[Patent Document 2] JP-A-2003-213179
[Patent Document 3] JP-A-2003-253167
[Patent Document 4] JP-A-2006-249429

SUMMARY OF THE INVENTION

The inventors have recently found the fact that when an ink composition contains a slightly water-soluble alkanediol and a polyalkylene glycol, a high-quality image free from bleeding or beading can be formed on a recording medium having a low aqueous ink-absorbing property, such as printing paper or off-set printing paper, in particular, even in a case of low-resolution printing. The invention is based on this finding.

Accordingly, it is an object of the invention to provide an ink composition that can form a high-quality image free from bleeding or beading on a recording medium having a low liquid-absorbing property against aqueous ink, such as printing paper or off-set printing paper, in particular, even in a case of low-resolution printing.

Then, the ink composition for ink jet recording according to the invention is an ink composition for ink jet recording including at least a coloring material, water, a slightly water-soluble alkanediol, and a polyalkylene glycol.

The invention can provide an ink composition that can form a high-quality image free from bleeding or beading on a recording medium having a low liquid-absorbing property against aqueous ink, such as printing paper or off-set printing paper, in particular, even in a case of low-resolution printing.

DETAILED DESCRIPTION OF THE PRESENT INVENTION

<Definition>

In the specification, the hydrocarbon group portion of an alkanediol may be a linear chain or a branched chain.

Furthermore, the term water-soluble refers to that the solubility in water (the amount of a solute in 100 g of water) at 20° C. is 10.0 g or more, and the term slightly water-soluble refers to that the solubility in water (the amount of a solute in 100 g of water) is less than 1.0 g. The term miscible refers to that a solution is translucent when the solubility in water (the amount of a solute in 100 g of water) at 20° C. is 10.0 g.

<Ink Composition>

The ink composition according to the invention includes at least an alkanediol and a polyalkylene glycol. By containing these two types of organic solvents as a combination with other components, beading of the ink composition is prevented in printing on printing paper or off-set printing paper, in particular, a high-quality image free from bleeding or beading can be formed even in a case of low-resolution printing, and an ink composition excellent in discharge stability can be produced.

In addition, in the specification, the term beading refers to local density spots of a similar color that occur in monochromatic printing (for example, when a monochromatic color (which means a single color is obtained as a result of the printing and a plurality of ink compositions may be used for forming the color) is printed in a 6-inch square) and does not refer to that a region not covered with the ink remains on a recording medium surface. Furthermore, the term bleeding of a color material refers to a phenomenon in which a mixed color occurs near the boundary when each monochromatic color is printed as adjoining faces (for example, each monochromatic color is printed as adjoining faces in a 3-inch square). The term bleeding of a solvent refers to a phenomenon in which density spots of similar colors occur near the boundary by modification of the coating condition due to a shift of the color material or the like caused by leaching of the solvent when each monochromatic color is printed as adjoining faces (for example, each monochromatic color is printed as adjoining faces in a 3-inch square).

Furthermore, in the invention, when thin printing paper or off-set printing paper having a paper density of 73.3 to 104.7 g/m$^2$ or 104.7 to 209.2 g/m$^2$ is used, preferably, even when thin printing paper or off-set printing paper having a paper density of 73.3 to 104.7 g/m$^2$ is used, as the above-described recording medium, the printed face is prevented from rolling inward, that is, so-called curling is prevented from occurrence.

As described above, it is not clear why a high-quality image free from bleeding or beading can be formed by including the polyalkylene glycol in addition to the alkanediol, but it is assumed as follows.

The beading of ink that occurs in recording on printing paper or off-set printing paper is thought to be caused by that the printing paper or off-set printing paper repels the ink because of the high surface tension of ink droplets and a large contact angle of the ink droplets with the printing paper or off-set printing paper surface. The repelled ink droplets flow together with adjacent ink droplets and aggregate each other to cause beading. Therefore, it is believed that a suppression in the fluidity of ink droplets by reducing the surface tension of the ink droplets is preferable to inhibit the beading.

Furthermore, the bleeding of ink that occurs in recording on printing paper or off-set printing paper is thought to be caused by that ink droplets have different degrees of surface tension from each other and thereby the ink droplets having low surface tension attached on a printing paper or off-set printing paper surface saturate ink droplets having high surface tension and spread thereto, resulting in a flow of ink. This ink flow is thought to be also affected by the difference in attaching time of adjacent ink droplets and the size of droplets at the time of attaching.

Therefore, it is believed that in order to inhibit the bleeding of ink, each ink composition has the same degree of surface tension. However, since it is difficult also to control the difference of attaching time of adjacent ink droplets and the size of droplets at the time of attaching to be same, it is believed that a reduction in fluidity of ink droplets be preferred.

It is believed that in the ink composition according to the invention, ink having low surface tension and low fluidity can be achieved without impairing other qualities required in the ink composition and thereby bleeding and beading are effectively inhibited.

<Slightly Water-Soluble Alkanediol>

In the invention, the slightly water-soluble alkanediol is preferably an alkanediol having 7 or more carbon atoms, more preferably an alkanediol having 7 to 10 carbon atoms. More preferably, the alkanediol is slightly water-soluble 1,2-alkanediol, which can more effectively prevent beading. Examples of the slightly water-soluble 1,2-alkanediol include 1,2-heptanediol, 1,2-octanediol, 5-methyl-1,2-hexanediol, 4-methyl-1,2-hexanediol, and 4,4-dimethyl-1,2-pentanediol. Among them, 1,2-octanediol is more preferred.

In the invention, the additive amount of the slightly water-soluble alkanediol may be arbitrarily determined in the range that the bleeding and beading of the ink can be efficiently inhibited, but is preferably 1 to 4 wt %, more preferably 2 to 4 wt %, and further preferably 2.5 to 3.5 wt % based on the total amount of the composition. When the amount of the slightly water-soluble alkanediol is within the above-mentioned range, especially, not less than the lower limit, occurrence of beading can be sufficiently inhibited. In addition, when the amount of the slightly water-soluble alkanediol is within the above-mentioned range, especially, not higher than the upper limit, the initial viscosity of the ink is not too high and separation of an oil layer can be effectively avoided under usual ink storage conditions, which is preferred from the viewpoint of ink storage stability.

<Polyalkylene Glycol>

The ink composition according to the invention contains a polyalkylene glycol.

The polyalkylene glycol contained in the ink composition according to the invention preferably includes one unit of an alkylene glycol having 2 to 4 carbon atoms and is more preferably polypropylene glycol. The polypropylene glycol is not particularly limited, but is preferably a diol-type from the viewpoints of ecotoxicity and environmental toxicity. Furthermore, the weight average molecular weight of the polypropylene glycol is not particularly limited, but is preferably 400 to 1000 and more preferably 400 to 700 from the viewpoint of separating the slightly water-soluble alkanediol from the aqueous layer.

The amount of the polyalkylene glycol in the invention may be arbitrarily determined as long as bleeding and beading of the ink can be efficiently inhibited, but is preferably 4 to 10 wt % and more preferably 5 to 8 wt % based on the total amount of the ink composition. When the amount of the polyalkylene glycol is within the above-mentioned range, especially, not less than the lower limit, the slightly water-soluble alkanediol can be well separated into an oil layer in the drying process, which is preferred. In addition, when the amount of the polyalkylene glycol is within the above-mentioned range, especially, not higher than the upper limit, the initial viscosity of the ink is not too high and separation of an oil layer can be effectively avoided under usual ink storage conditions, which is preferred from the viewpoint of ink storage stability.

In addition, since the polyalkylene glycol contained in the ink composition according to the invention is hardly dried even if it is left under high-temperature and low-humidity, the polyalkylene glycol also has an advantage of improving the property of recovering from clogging of a nozzle under environment of 50° C./15% humidity.

Furthermore, it has been found an effect that in the ink composition according to the invention, the ink is prevented from too rapidly aggregating on a recording medium, when the pigment is in the state being dispersed in a dispersion resin. The reason thereof is not clear, but it is assumed as follows.

It is thought that, in general, the lipophilic components in ink are still under a condition being dispersed in water at the moment that the ink attached to a recording medium, and the water is lost first in the drying process after the attachment to the recording medium, which causes phase transition from an O/W state to a W/O state. On the other hand, the pigment is present in the aqueous layer of the ink in the state being dispersed in a dispersion resin having water dispersibility, and the pigment cannot be present in the oil layer. Therefore, it is thought that the fluidity of the pigment in the aqueous layer is prevented by the wall of the oil layer when the O/W state is phase-transited to the W/O state, resulting in aggregation of the ink. However, it is thought that the polyalkylene glycol finely splits the wall of the oil layer. It is thought, as a result, that the fluidity of the pigment in the aqueous layer is increased, and the ink is prevented from too rapidly aggregating.

Furthermore, in the invention, the content ratio of the slightly water-soluble alkanediol and the polyalkylene glycol is preferably 1:1 to 1:10, more preferably 1:1 to 1:5. Within this range, the discharge stability of ink can be improved.

<Symmetrical Both-End-Type Alkanediol>

According to preferred embodiment of the invention, the ink composition according to the invention may contain a symmetrical both-end-type alkanediol, in addition to the slightly water-soluble alkanediol and the polyalkylene glycol. This is advantageous in that occurrence of bleeding of the materials other than solid contents contained in the ink composition, that is, the aqueous solution containing the solvent, can be further inhibited.

The water-soluble symmetrical both-end-type alkanediol is preferably an alkanediol whose main chain has 3 or more carbon atoms, more preferably 4 to 6 carbon atoms. Furthermore, the water-soluble symmetrical both-end-type alkanediol may have a branched chain. In the specification, the term "symmetrical" refers to, in an alkanediol having hydroxyl groups at both ends of the alkyl chain, a both-end-type alkanediol having a carbon atom lying with the same distances from both the hydroxyl groups as the symmetry axis, such as 1,5-pentanediol. The water-soluble symmetrical both-end-type alkanediol according to the invention is more preferably 2-methyl-1,3-propanediol, 3-methyl-1,5-pentanediol, 1,5-pentanediol, or 1,6-hexanediol. Among them, water-soluble symmetrical both-end-type alkanediols having a large number of carbon atoms are preferably used, from the viewpoint of discharge stability. Water-soluble symmetrical both-end-type alkanediols having 6 carbon atoms, for example, 3-methyl-1,5-pentanediol and 1,6-hexanediol, are excellent in ability of dissolving slightly water-soluble alkanediols in water and therefore provides improved discharge stability.

In particular, since 1,6-hexanediol is well water-soluble and is solid at ordinary temperature, it is excellent in the ability of recovering from clogging and is therefore more preferred. The reason thereof is not clear, but it is thought that since solidified ink near a nozzle contains the well water-soluble 1,6-hexanediol in a solid form, the 1,6-hexanediol is dissolved in liquid ink that is brought into contact with the solidified ink in the cleaning operation and triggers the recovery from clogging.

The reason for that the occurrence of bleeding of the aqueous solution containing the above-mentioned solvent can be further inhibited is not clear, but it is thought as follows.

Since the slightly water-soluble alkanediol has significantly low surface tension and a low evaporating drying property, it is thought that saturation and spreading of the aqueous solution containing the solvent continue even after the movement of the color material stopped. Therefore, when a recorded image has a large difference in the amount of attached ink depending on the portion, the aqueous solution containing the solvent bleeds from a portion where the amount of the attached ink is large to a portion where the amount of the attached ink is small. By adding the symmetrical both-end-type alkanediol having high surface tension, the bleeding of the solvent can be inhibited. Since the symmetrical both-end-type alkanediol has high ability of dissolving the slightly water-soluble alkanediol and the polyalkylene glycol, it is thought that the symmetrical both-end-type alkanediol prevents the wall of the oil layer from being excessively finely split by the polyalkylene glycol during the drying process of ink droplets.

The amount of the water-soluble symmetrical both-end-type alkanediol according to the invention may be arbitrarily determined in the range that the effect of preventing bleeding can be achieved, but is preferably 0.1 to 4 wt %, more preferably 0.6 to 1.4 wt %, based on the total amount of the ink composition. When the amount of the water-soluble symmetrical both-end-type alkanediol is within the above-mentioned range, especially, not less than the lower limit, satisfactory discharge stability can be achieved and the wiping durability is not deteriorated, which is preferred. The term wiping performance refers to the deterioration in landing precision of ink droplets, caused by the deterioration in the water repellency of the peripheral surface of an ink nozzle, which occurs when the cleaning operation is repeated. It is thought that the slightly water-soluble alkanediol and the polyalkylene glycol are deposited on the peripheral surface of the ink nozzle, though the reason thereof is unclear. In addition, when the amount of the water-soluble symmetrical both-end-type alkanediol is within the above-mentioned range, especially, not higher than the upper limit, the slightly water-soluble alkanediol and the polyalkylene glycol are not excessively dissolved, which is preferable.

The water-soluble symmetrical both-end-type alkanediol, the water-soluble symmetrical both-end-type alkanediol used in the invention is a penetrative wetting agent having surface tension lower than that of glycerin. For example, the surface tension of a 10% aqueous solution of 1,6-hexanediol is 41.5 mN/m, the surface tension of a 10% aqueous solution of 2-methyl-1,3-propanediol is 57.5 mN/m, and the surface tension of a 10% aqueous solution of 3-methyl-1,5-butanediol is 45.8 mN/m.

The content ratio of the water-soluble symmetrical both-end-type alkanediol and the polyalkylene glycol according to the invention is preferably 1:1 to 1:100. Within this range, the polyalkylene glycol with a weight average molecular weight of 2000 or less can be stably dissolved in ink, and the discharge stability is improved. That is, when the ratio of the water-soluble symmetrical both-end-type alkanediol is within the above-mentioned range, especially, not higher than the upper limit, a reduction in the initial viscosity of the ink and a reduction in the beading spot are possible. Furthermore, when the ratio of the water-miscible water-soluble symmetrical both-end-type alkanediol is within the above-mentioned range, especially, not less than the lower limit, the ink can stably dissolve the polyalkylene glycol, and it is possible to inhibit the viscosity from varying with elapsed time and to maintain the storage stability. In addition, deterioration in wiping durability can be prevented.

In the above-mentioned range, when the ratio of the water-soluble symmetrical both-end-type alkanediol is small, a polyalkylene glycol having a molecular weight of 700 or less is more preferred from the viewpoint of the wiping durability.

The content ratio of the water-soluble symmetrical both-end-type alkanediol and the slightly water-soluble alkanediol according to the invention is preferably 1:80 to 4:1 and more preferably 1:40 to 2:1. Within this range, the discharge stability of ink can be improved. That is, when the ratio of the water-soluble symmetrical both-end-type alkanediol is within the above-mentioned range, especially, not higher than the upper limit, the initial viscosity of the ink does not become high, and the beading spots can be reduced. In addition, when the ratio of the water-soluble symmetrical both-end-type alkanediol is within the above-mentioned range, especially, not less than the lower limit, the ink can stably dissolve the slightly water-soluble alkanediol, and it is possible to inhibit the viscosity from varying with elapsed time and to maintain the storage stability. In addition, by controlling the content ratio of the water-soluble symmetrical both-end-type alkanediol and the slightly water-soluble alkanediol according to the invention within the above-mentioned range, the wiping durability can be improved.

Furthermore, when the symmetrical both-end-type alkanediol, the slightly water-soluble alkanediol, and the polyalkylene glycol are denoted by X, Y, and Z, respectively, the content ratio thereof is preferably $X:(Y+Z)=1:140$ to $4:5$. Within this range, the discharge stability, the storage stability, and the wiping durability can be ensured. The reason thereof is not clear, but it is thought that this is brought by the balance between the effect of the polyalkylene glycol to finely split the wall of the oil wall in the drying process and the effect of the symmetrical both-end-type alkanediol to inhibit the wall of the oil layer from being excessively finely split in the drying process. Within the above-mentioned range and within the range of $X:Y=1:80$ to $4:1$, when the ratio of the slightly water-soluble alkanediol is high, a polyalkylene glycol having a molecular weight of 700 or less is more preferred from the viewpoint of the wiping durability.

It is thought that the layer transition occurs because that water, which has a low molecular weight, dries promptly in the drying process, but the slightly water-soluble alkanediol and the polyalkylene glycol remain without drying. It is thought that since the resin adsorbed to the pigment is left in the oil layer at the time when the water is sharply lost from the dispersion state excellent in fluidity, the resin is modified to an aggregated state having high thickness.

Furthermore, the sum of the contents of the slightly water-soluble alkanediol and the polyalkylene glycol according to the invention is preferably 14 wt % or less based on the amount of the ink composition. Within this range, the initial viscosity of the ink can be suppressed to a low level, beading does not occur in a recording medium having a low ink-absorbing property, such as printing paper or off-set printing paper, and also bleeding of the color material is excellently low.

In addition, in the invention, the sum of the contents of the slightly water-soluble alkanediol, the polyalkylene glycol, and the water-soluble symmetrical both-end-type alkanediol is preferably 18 wt % or less based on the amount of the ink composition. Within this range, the initial viscosity of the ink can be suppressed to a low level, beading spots do not occur in a recording medium having a low ink-absorbing property, such as printing paper or off-set printing paper, and not only bleeding of the color material but also bleeding of the solvent are excellently low. In particular, since the bleeding of the solvent is excellently low, the recording property on synthetic paper that hardly absorbs water is excellent.

According to an embodiment of the invention, it is preferable that the ink composition further contain 0.1 to 4 wt % of 1,2-hexanediol. By containing 0.1 to 4 wt % of 1,2-hexanediol, a high-quality image free from bleeding or beading can be further achieved. In addition, 1,2-hexanediol is effective as a regulator when the discharge ability is different due to the pigment type and resin content.

Furthermore, according to an embodiment of the invention, it is preferable that the ink composition further contain 0.1 to 4 wt % of 4-methyl-1,2-pentanediol. By containing 0.1 to 4 wt % of 1,2-hexanediol, a high-quality image free from bleeding or beading can be further achieved. In addition, 4-methyl-1,2-pentanediol is effective as a regulator when the discharge ability is different due to the pigment type and resin content.

Furthermore, according to an embodiment of the invention, the ink composition may further contain a polyol alkyl ether. By adding the polyol alkyl ether, the property of recovering from clogging in the ink cap for capping an ink jet head can be improved. Here, the term clogging in the ink cap refers to that liquid waste remaining in the cap is solidified by drying and clogs the micropores of an ink absorber, such as nonwoven fabric, in the ink cap. By improving the property of recovering from clogging in the ink cap, a reduction in success rate of cleaning can be inhibited, and the property of recovering from nozzle clogging can be improved.

The polyol alkyl ether is preferably an alkylene glycol methyl ether, and examples thereof include propylene glycol monomethyl ether, ethylene glycol monomethyl ether, diethylene glycol dimethyl ether, dipropylene glycol monomethyl ether, triethylene glycol dimethyl ether, and triethylene glycol monomethyl ether. An alkylene glycol monomethyl ether is more preferred from the viewpoint of the aggregating property, and triethylene glycol methyl ether is preferred from the viewpoint of the flash point. Triethylene glycol monomethyl ether is preferred from the viewpoints of environmental toxicity and ecotoxicity.

Furthermore, the content ratio of the triethylene glycol monomethyl ether and the slightly water-soluble alkanediol is not particularly limited, but is preferably 3:1 to 1:6 and more preferably 3:1 to 1:1. Within this range, the property of recovering from clogging in the ink cap for capping an ink jet head can be further improved.

In addition, the content ratio of the sum of the amounts of the triethylene glycol monomethyl ether and the polyalkylene glycol and the amount of the slightly water-soluble alkanediol is not particularly limited, but is preferably 3:1 to 1:6 and more preferably 3:1 to 1:1. Within this range, the property of recovering from clogging in the ink cap for capping an ink jet head can be further improved.

In addition, the content ratio of the triethylene glycol monomethyl ether and the polyalkylene glycol is not particularly limited, but is preferably 5:1 to 1:5 and more preferably 5:1 to 1:1. Within this range, the property of recovering from clogging in the ink cap for capping an ink jet head can be further improved.

The amount of the triethylene glycol monomethyl ether based on the total amount of the ink composition is not particularly limited, but is preferably 0.5 to 9.0 wt % and more preferably 0.5 to 3.0 wt %.

In addition, in the invention, the sum of the contents of the triethylene glycol monomethyl ether and the polyalkylene glycol is not particularly limited, but is preferably 9.0 wt % or less and more preferably 3.0 wt % or less based on the amount of the ink composition. Within this range, the property of recovering from clogging in the ink cap for capping an ink jet head can be further improved.

<Coloring Material>

The coloring material used in the ink composition for ink jet recording according to the invention may be a dye or a pigment, but the pigment is preferred from the viewpoints of light resistance and water resistance. Furthermore, the coloring material preferably contains the pigment and a dispersant mentioned below that can disperse the pigment in ink.

Both inorganic pigments and organic pigments can be used as the pigment and may be each used alone or as a mixture of a plurality of types thereof. As the inorganic pigment, for example, in addition to titanium oxide and iron oxide, carbon black prepared by a known method such as a contact method, a furnace method, or a thermal method can be used. Furthermore, as the organic pigment, azo pigments (including azolakes, insoluble azo pigments, condensed azo pigments, and chelate azo pigments), polycyclic pigments (for example, phthalocyanine pigments, perylene pigments, perynone pigments, anthraquinone pigments, quinacridone pigments, dioxadine pigments, thioindigo pigments, isoindolinone pigments, and quinophthalone pigments), dye chelates (for example, basic dye-type chelates and acid dye-type chelates), nitro pigments, nitroso pigments, and aniline black can be used.

Specific examples of the pigment are properly determined according to the type (color) of a desired ink composition. Examples of the pigment for a yellow ink composition include C.I. pigment yellows 1, 2, 3, 12, 14, 16, 17, 73, 74, 75, 83, 93, 95, 97, 98, 109, 110, 114, 128, 129, 138, 139, 147, 150, 151, 154, 155, 180, and 185, and one or two or more of them are used. Among them, especially, one or two or more selected from the group consisting of C.I. pigment yellows 74, 110, 128, and 129 are preferably used. Examples of the pigment for a magenta ink composition include C.I. pigment reds 5, 7, 12, 48(Ca), 48(Mn), 57(Ca), 57:1, 112, 122, 123, 168, 184, 202, and 209 and C.I. pigment violet 19, and one or two or more of them are used. Among them, especially, one or two or more selected from the group consisting of C.I. pigment reds 122, 202, and 209 and C.I. pigment violet 19 are preferably used, and also a solid solution thereof may be used. Examples of the pigment for a cyan ink composition include C.I. pigment blues 1, 2, 3, 15:3, 15:4, 15:34, 16, 22, and 60 and C.I. vat blues 4 and 60, and one or two or more of them are used. Among them, especially, C.I. pigment blue 15:3 and/or 15:4 are preferably used, and, especially, C.I. pigment blue 15:3 is preferably used.

Examples of the pigment for a black ink composition include inorganic pigments, for example, carbons such as lamp black (C.I. pigment black 6), acetylene black, furnace black (C.I. pigment black 7), channel black (C.I. pigment black 7), and carbon black (C.I. pigment black 7) and iron oxide pigments; and organic pigments such as aniline black (C.I. pigment black 1). In the invention, carbon black is preferably used. Examples of the carbon black include #2650, #2600, #2300, #2200, #1000, #980, #970, #966, #960, #950, #900, #850, MCF-88, #55, #52, #47, #45, #45L, #44, #33, #32, and #30 (these are manufactured by Mitsubishi Chemical Corp.), Special Blaek 4A and 550 and Printex 95, 90, 85, 80, 75, 45, and 40 (these are manufactured by Degussa AG), Regal 660, Rmogul L, and monarch 1400, 1300, 1100, 800, and 900 (these are manufactured by Cabot Corp.), and Raven 7000, 5750, 5250, 3500, 3500, 2500 ULTRA, 2000, 1500, 1255, 1200, 1190 ULTRA, 1170, 1100 ULTRA, and Raven 5000 UIII (these are manufactured by Columbian Chemicals Co.).

The concentration of the pigment may be adjusted to a proper pigment concentration (content) when the ink composition is prepared and, therefore, is not particularly limited. However, in the invention, the concentration of the solid content in the pigment is preferably 7 wt % or more and more preferably 10 wt % or more. The ink droplets attached on a recording medium saturate and spread on the surface of the recording medium. By controlling the pigment solid concentration to a high level of 7% wt % or more, the fluidity of the ink after the completion of the saturation and spreading is rapidly lost, and thereby bleeding can be further inhibited even in a case of printing on a recording medium, such as printing paper or off-set printing paper, in particular, at low-resolution. That is, it is thought that ink saturates and spreads even on a recording medium having a low ink-absorbing property by using a combination of specific two types of organic solvents mentioned above, and simultaneously, bleeding can be inhibited by decreasing the fluidity of the ink on the recording medium by controlling the concentration of the ink solid content to be high. In particular, when the weight of one drop of the ink is 6 ng or more, the effects of inhibiting bleeding and beading are remarkable.

The above-mentioned pigment is preferably a pigment kneaded with a dispersant described below, from the viewpoints of simultaneously achieving gloss of an image, prevention of bronzing, and storage stability of the ink composition and at the same time enabling to form a color image further excellent in gloss.

<Dispersant>

The ink composition according to the invention preferably contains, as a dispersant for dispersing the color material, at least one resin selected from the group consisting of styrene-acrylic acid-based copolymer resins, oxyethyl acrylate-based resins, urethane-based resins, and fluorene-based resins, and more preferably at least one selected from the group consisting of oxyethyl acrylate-based resins and fluorene-based resins. These copolymer resins improve the dispersing property by being adsorbed to the pigment.

Examples of the hydrophobic monomer of the copolymer resin include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethyl hexyl acrylate, 2-ethyl hexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylol propane triacrylate, trimethylol propane trimethacrylate, glycerol acrylate, glycerol methacrylate, styrene, methylstyrene, vinyl toluene, and hydroxyethylated orthophenylphenol acrylate. These may be used alone or as a mixture of two or more thereof.

Examples of the hydrophilic monomer include acrylic acid, methacrylic acid, maleic acid, and itaconic acid.

From the viewpoints of simultaneously achieving gloss of a color image, prevention of bronzing, and storage stability of the ink composition and at the same time enabling to form the color image being further excellent in gloss, the copolymer of the above-mentioned hydrophobic monomer and hydrophilic monomer is preferably at least any of a styrene-(meth)acrylic acid copolymer resin, a styrene-methylstyrene-(meth)acrylic acid copolymer resin, a styrene-maleic acid copolymer resin, a (meth)acrylic acid-(meth)acrylic acid ester copolymer resin, a styrene-(meth)acrylic acid-(meth)acrylic acid ester copolymer resin, or a hydroxyethylated orthophenylphenol acrylic acid ester-(meth)acrylic acid copolymer resin.

The copolymer resin may be a resin containing a polymer prepared by a reaction of styrene and acrylic acid or acrylic acid ester (styrene-acrylic acid resin). Alternatively, the copolymer resin may be an acrylic acid-based water-soluble resin. Furthermore, the copolymer resin may be a salt thereof, such as a sodium, potassium, ammonium, triethanolamine, triisopropanolamine, triethylamine, or diethanolamine salt.

The acid value of the copolymer resin is preferably 50 to 320 and more preferably 100 to 250 from the viewpoints of simultaneously achieving gloss of a color image, prevention of bronzing, and storage stability of the ink composition and at the same time enabling to form the color image being further excellent in gloss.

The weight average molecular weight (Mw) of the copolymer resin is preferably 2000 to 30000 and more preferably 2000 to 20000 from the viewpoints of simultaneously achieving gloss of a color image, prevention of bronzing, and storage stability of the ink composition and at the same time enabling to form the color image being further excellent in gloss.

The glass transition temperature (Tg: measured in accordance with JIS K6900) of the copolymer resin is preferably 30° C. or more and more preferably 50 to 130° C. from the viewpoints of simultaneously achieving gloss of a color image, prevention of bronzing, and storage stability of the ink composition and at the same time enabling to form the color image being further excellent in gloss.

The copolymer resin is adsorbed to the pigment or free in a pigment dispersion and preferably has a maximum particle diameter of 0.3 μm or less and more preferably has an average particle diameter of 0.2 μm or less (further preferably 0.1 μm or less), from the viewpoints of simultaneously achieving gloss of a color image, prevention of bronzing, and storage stability of the ink composition and at the same time enabling to form the color image being further excellent in gloss. Here, the average particle diameter is the average value of dispersion diameters of particles actually formed by the pigment in a dispersion (50% cumulative diameter) and can be measured with, for example, Microtrac UPA (Microtrac Inc.).

The content of the copolymer resin is preferably 20 to 50 parts by weight and further preferably 20 to 40 parts by weight based on 100 parts by weight of the pigment, from the viewpoints of simultaneously achieving gloss of a color image, prevention of bronzing, and storage stability of the ink composition and at the same time enabling to form the color image being further excellent in gloss.

In the invention, oxyethyl acrylate-based resins also can be used as the copolymer resin. The use of such a resin provides a reduction in the initial viscosity of ink, excellent storage stability at high temperature, and an excellent property of recovering from clogging and therefore is further preferred.

The above-mentioned oxyethyl acrylate-based resin is not particularly limited, but is preferably a compound represented by the following Formula (I). The compound represented by the following Formula (I) is, for example, a resin containing, in the monomer mole ratio, 45 to 55% of ortho-hydroxyethylated phenylphenol acrylate having CAS No. 72009-86-0, 20 to 30% of acrylic acid having CAS No. 79-10-7, and 20 to 30% of methacrylic acid having CAS No. 79-41-4. These may be used alone or as a mixture of two or more thereof. Furthermore, the monomer composition ratio is not particularly limited, but is preferably 70 to 85% of the ortho-hydroxyethylated phenylphenol acrylate having CAS No. 72009-86-0, 5 to 15% of acrylic acid having CAS No. 79-10-7, and 10 to 20% of methacrylic acid having CAS No. 79-41-4.

[Formula 1]

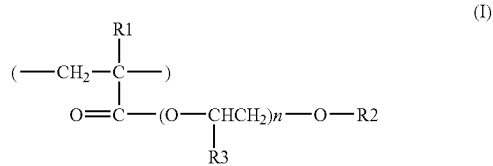

(R1 and/or R3 are a hydrogen atom or a methyl group, R2 is an alkyl group or an aryl group, and n is an integer of 1 or more.)

Preferred examples of the compound represented by Formula (I) above include nonylphenoxypolyethylene glycol acrylate and polypropylene glycol #700 acrylate.

The content of the oxyethyl acrylate-based resin is preferably 10 to 40 parts by weight and further preferably 15 to 25 parts by weight based on 100 parts by weight of the pigment, from the viewpoints of simultaneously lowering the initial viscosity of an ink composition and achieving storage stability of the ink composition and at the same time preventing the formation of aggregation spots and enabling to form a color image excellent in the burying property.

In the above-mentioned oxyethyl acrylate-based resin, the total composition ratio of the resins derived from monomers having hydroxyl groups selected from the group of acrylic acids and methacrylic acids is preferably 30 to 70% and further preferably 40 to 60%, from the viewpoints of simultaneously lowering the initial viscosity of an ink composition and achieving storage stability of the ink composition and at the same time achieving the property of recovering from clogging.

The number average molecular weight (Mn) of the oxyethyl acrylate-based resin before cross-linking is preferably 4000 to 9000 and more preferably 5000 to 8000, from the viewpoints of simultaneously lowering the initial viscosity of an ink composition and achieving storage stability of the ink composition. The Mn is measured by, for example, GPC (gel permeation chromatography).

The oxyethyl acrylate-based resin is adsorbed to the pigment or free in a pigment dispersion, and the copolymer resin preferably has a maximum particle diameter of 0.3 µm or less and more preferably has an average particle diameter of 0.2 µm or less (further preferably 0.1 µm or less), from the viewpoints of simultaneously achieving gloss of a color image, prevention of bronzing, and storage stability of the ink composition and at the same time enabling to form the color image being further excellent in gloss. Here, the average particle diameter is the average value of dispersion diameters of particles actually formed by the pigment in a dispersion (50% cumulative diameter) and can be measured with, for example, Microtrac UPA (Microtrac Inc.).

The content of the oxyethyl acrylate-based resin is preferably 20 to 50 parts by weight and further preferably 20 to 40 parts by weight based on 100 parts by weight of the pigment, from the viewpoints of simultaneously achieving gloss of a color image, prevention of bronzing, and storage stability of the ink composition and at the same time enabling to form the color image being further excellent in gloss.

Furthermore, in the invention, by using a urethane-based resin as a fixative pigment dispersant, gloss of a color image, prevention of bronzing, and storage stability of the ink composition are simultaneously achieved, and at the same time the color image can be formed to be further excellent in gloss. The urethane-based resin is a resin containing a polymer obtained by a reaction of a diisocyanate compound and a diol compound and, in the invention, is preferably a resin having a urethane bond and/or an amide bond and an acid group.

Examples of the diisocyanate compound include araliphatic diisocyanate compounds such as hexamethylene diisocyanate and 2,2,4-trimethyl hexamethylene diisocyanate, aromatic diisocyanate compounds such as toluoylene diisocyanate and phenylmethane diisocyanate, and modified derivatives thereof.

Examples of the diol compound include polyethers such as polyethylene glycol and polypropylene glycol, polyesters such as polyethylene adipate and polybutylene adipate, and polycarbonates.

The acid value of the urethane-based resin is preferably 10 to 300 and further preferably 20 to 100 from the viewpoints of simultaneously achieving gloss of a color image, prevention of bronzing, and storage stability of the ink composition and at the same time enabling to form the color image being further excellent in gloss. Here, the acid value is the number of mg of KOH required to neutralize 1 g of the resin.

The weight average molecular weight (Mw) of the urethane resin before cross-linking is preferably 100 to 200000 and more preferably 1000 to 50000 from the viewpoints of simultaneously achieving gloss of a color image, prevention of bronzing, and storage stability of the ink composition and at the same time enabling to form the color image being further excellent in gloss. The Mw is measured by, for example, GPC (gel permeation chromatography).

The glass transition temperature (Tg: measured in accordance with JIS K6900) is preferably −50 to 200° C. and further preferably −50 to 100° C. from the viewpoints of simultaneously achieving gloss of a color image, prevention of bronzing, and storage stability of the ink composition and at the same time enabling to form the color image being further excellent in gloss.

The urethane-based resin preferably has a carboxyl group.

The content of the urethane-based rein is preferably 20 to 50 parts by weight and further preferably 20 to 40 parts by weight based on 100 parts by weight of the pigment from the viewpoints of simultaneously achieving gloss of a color image, prevention of bronzing, and storage stability of the ink composition and at the same time enabling to form the color image being further excellent in gloss.

Furthermore, in the invention, a fluorene-based resin can be used as a fixative pigment dispersant. The use of the resin provides a reduction in the initial viscosity of ink, storage stability at high temperature, and an excellent fixing property to printing paper or off-set printing paper.

In addition, the fluorene-based resin is not restricted, as long as the resin has a fluorene skeleton, and can be obtained by, for example, copolymerizing the following monomer units:

cyclohexane, 5-isocyanate-1-(isocyanate methyl)-1,3,3-trimethyl (CAS No. 4098-71-9);

ethanol, 2,2'-[9H-fluoren-9-ylidenebis(4,1-phenyleneoxy)]bis (CAS No. 117344-32-8);

propionic acid, 3-hydroxy-2-(hydroxymethyl)-2-methyl (CAS No. 4767-03-7); or ethanamine, N,N-diethyl- (CAS No. 121-44-8).

The fluorene-based resin is not particularly limited. For example, the monomer composition ratio is not particularly limited, but is preferably 35 to 45% of CAS No. 4098-71-9, 40 to 50% of CAS No. 117344-32-8, 5 to 15% of CAS No. 4767-03-7, and 5 to 10% of CAS No. 121-44-8.

The number average molecular weight (Mn) of the fluorene-based resin before cross-linking is preferably 2000 to 5000 and more preferably 3000 to 4000 from the viewpoints of simultaneously achieving the initial viscosity of the ink composition and the storage stability of the ink composition. The Mn is measured by, for example, GPC (gel permeation chromatography).

The fluorene-based resin is adsorbed to the pigment or free in a pigment dispersion, and the copolymer resin preferably has a maximum particle diameter of 0.3 µm or less and more preferably has an average particle diameter of 0.2 µm or less (further preferably 0.1 µm or less), from the viewpoints of simultaneously achieving gloss of a color image, prevention of bronzing, and storage stability of the ink composition and at the same time enabling to form the color image being further excellent in gloss. Here, the average particle diameter is the average value of dispersion diameters of particles actually formed by the pigment in a dispersion (50% cumulative diameter) and can be measured with, for example, Microtrac UPA (Microtrac Inc.).

The content of the fluorene-based resin is preferably 20 to 50 parts by weight and further preferably 20 to 40 parts by weight based on 100 parts by weight of the pigment from the viewpoints of simultaneously achieving a color image-fixing property, prevention of bronzing, and storage stability of the ink composition and at the same time enabling to form the color image being further excellent in gloss.

The weight ratio of the copolymer resin and the fixative pigment dispersant (the former/the latter) is preferably 1/2 to 2/1 and is further preferably 1/1.5 to 1.5/1 from the viewpoints of simultaneously achieving gloss of a color image, prevention of bronzing, and storage stability of the ink composition and at the same time enabling to form the color image being further excellent in gloss.

The weight ratio of the solid content of the pigment and the total solid content of the copolymer resin and the fixative pigment dispersant (the former/the latter) is preferably 100/40 to 100/100 from the viewpoints of simultaneously achieving gloss of a color image, prevention of bronzing, and storage stability of the ink composition and at the same time enabling to form the color image being further excellent in gloss.

Furthermore, a surfactant may be used as the dispersant. Examples of the surfactant include anionic surfactants such as fatty acid salts, higher alkyl dicarboxylates, higher alcohol sulfates, higher alkyl sulfonates, condensation products of higher fatty acids and amino acids, sulfosuccinates, naphthenates, liquid fatty oil sulfates, and alkylallyl sulfonates; cationic surfactants such as fatty acid amine salts, quaternary ammonium salts, sulfonium salts, and phosphonium; and nonionic surfactants such as polyoxyethylene alkyl ethers, polyoxyethylene alkyl esters, sorbitan alkyl esters, and polyoxyethylene sorbitan alkyl esters. It is needless to say that these surfactants function as surfactants when they are added to ink compositions.

<Surfactant>

The ink composition for ink jet recording according to the invention may contain a surfactant. By using the surfactant, an image having excellent gloss can be provided to a recording medium whose surface is coated by a resin for receiving ink and also to a recording medium such as photographic paper in which gloss is more valued. Especially, even when a recording medium whose reception layer on the surface has a coated layer for receiving oil-based ink, such as printing paper or off-set printing paper, is used, bleed (bleeding) of colors can be prevented, and also whitening caused by reflected light, which occurs with an increase in the adhesion amount of ink, can be prevented.

The surfactant used in the invention is preferably a polyorganosiloxane-based surfactant, which can increase the permeability of ink by increasing wettability to a recording medium surface when a recording image is formed. When the polyorganosiloxane-based surfactant is used, since the above-described one type of the slightly water-soluble alkanediol and one type of the polyalkylene glycol are contained, the solubility of the surfactant into the ink is increased to prevent occurrence of insoluble matters or the like, and thereby an ink composition having excellent in discharge stability can be provided.

As the surfactant described above, those that are commercially available may be used. For example, OLFINE PD-501 (manufactured by Nissin Chemical Industry Co., Ltd.), OLFINE PD-570 (manufactured by Nissin Chemical Industry Co., Ltd.), BYK-347 (manufactured by BYK-Chemie), and BYK-348 (manufactured by BYK-Chemie) can be used.

Furthermore, the polyorganosiloxane-based surfactant more preferably contains one or more compounds represented by the following Formula (II):

[Formula 2]

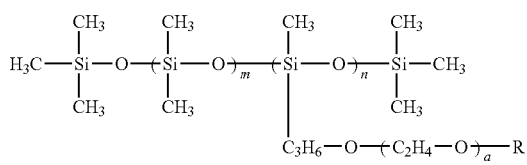

(II)

(in the Formula, R represents a hydrogen atom or a methyl group, a represents an integer of 7 to 11, m represents an integer of 30 to 50, and n represents an integer of 3 to 5), or contains one or more compounds represented by the above Formula (II) wherein R represents a hydrogen atom or a methyl group, a represents an integer of 9 to 13, m represents an integer of 2 to 4, and n represents an integer of 1 or 2. Furthermore, the polyorganosiloxane-based surfactant more preferably contains one or more compounds represented by the above Formula (II) wherein R represents a hydrogen atom or a methyl group, a represents an integer of 6 to 18, m represents an integer of 0, and n represents an integer of 1. The use of such specific polyorganosiloxane-based surfactants further reduces beading and bleeding of ink even in the case of printing on printing paper or off-set printing paper as a recording medium.

In the compounds of the above-mentioned Formula (II), the beading of ink can be further reduced by using a compound whose R is a methyl group.

In addition, in the compounds of the above-mentioned Formula (II), the bleeding of ink can be further reduced by simultaneously using a compound whose R is a hydrogen atom.

The amount of the surfactant contained according to the ink composition of the invention is preferably 0.01 to 1.0 wt % and more preferably 0.05 to 0.50 wt %. In particular, the content of the surfactant when a surfactant with R being a methyl group is used is preferably higher than that when a surfactant with R being a hydrogen atom is used.

In addition, a Gemini-type surfactant can be suitably used as the surfactant used in the invention. The use of the Gemini-type surfactant in a combination with the slightly water-soluble alkanediol can uniformly disperse the slightly water-soluble solvent, resulting in a reduction in the initial viscosity of ink. Therefore, the additive amounts of the color material, the clogging-preventing agent, and other additives into the ink composition can be increased, and, consequently, an image having excellent color reproducibility can be formed on not only plain paper but also a recording medium having a porous surface on which a resin or particles for receiving ink is coated. Especially, even when a recording medium whose reception layer on the surface has a coated layer for receiving oil-based ink, such as printing paper or off-set printing paper, is used, bleeding (bleed) of colors can be prevented, and also color density spots caused by ink flow among dots, which occurs with an increase in the adhesion amount of ink, can be prevented. The reason thereof is not clear, but it is thought that the fluidity of the color material is lost because that the Gemini-type surfactant forms extremely stable oil gel with the slightly water-soluble solvent due to the excellent orientation of the Gemini-type surfactant. Therefore, the effect caused by the addition of the Gemini-type surfactant can be higher when the amount of the slightly water-soluble solvent is larger. Here, the term "Gemini-type surfactant" refers to a surfactant having a structure in which two surfactant molecules are connected to each other via a linker.

The Gemini-type surfactant is preferably a two-chain/two-hydrophilic group-type surfactant having a structure in which the hydrophilic group portions of a couple of one-chain type surfactants are connected to each other via a linker having a hydrophilic group. Furthermore, the hydrophilic group portions of the one-chain-type surfactants are preferably acidic amino acid residues, and the linker is preferably a basic amino acid. Specific examples include surfactants having a structure in which a couple of one-chain-type surfactants having a hydrophilic group portion of, for example, glutamic acid or aspartic acid is connected to each other via a linker such as arginine, lysin, or histidine. Such a Gemini-type surfactant used in the invention is preferably a surfactant represented by the following Formula (III):

[Formula 3]

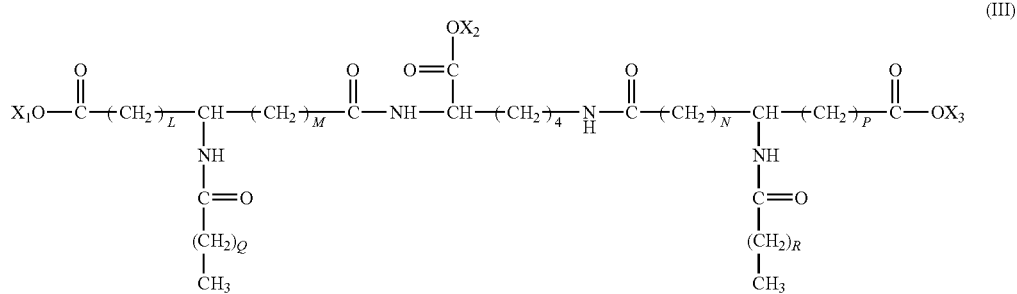

(in the Formula, $X_1$, $X_2$, and $X_3$ each independently represent a hydrogen atom or an alkali metal, but do not simultaneously represent hydrogen atoms or alkali metals; L and M each independently represent 0 or 2, but do not simultaneously represent 0 or 2; N and P each independently represent 0 or 2, but do not simultaneously represent 0 or 2; Q and R each represent an integer of 8 to 18).

In the above Formula (III), the alkali metal is preferably Na, and Q and R are each preferably around 10. Examples of such compounds include sodium salts of condensation products of N-lauroyl-L-glutamic acid and L-lysin. The compounds represented by the above Formula may be those that are commercially available. For example, Pellicer L-30 (manufactured by Asahi Kasei Chemicals Corp.), which is a 30% aqueous solution of the sodium salt of a condensation product of N-lauroyl-L-glutamic acid and L-lysin, can be suitably used.

In the invention, by using the Gemini-type surfactant, the permeability of ink can be increased by enhancing the wettability to a recording medium surface when a recording image is formed. As a result, uneven aggregation of ink is reduced even in the case of printing on printing paper or off-set printing paper as a recording medium. In addition, since the ink composition according to the invention contains the slightly water-soluble alkanediol, the solubility of the surfactant into ink is improved to inhibit the generation of insoluble matters or the like. Therefore, an ink composition excellent in the discharge stability can be provided.

The amount of the Gemini-type surfactant contained in the ink composition according to the invention is preferably 0.01 to 1.0 wt % and more preferably 0.05 to 0.50 wt %.

The ink composition according to the invention may further contain another surfactant, for example, an acetylene glycol-based surfactant, an anionic surfactant, a nonionic surfactant, or an ampholytic surfactant.

Among them, examples of the acetylene glycol-based surfactant include 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol. In addition, the acetylene glycol-based surfactant may be those that are commercially available, and examples thereof include Olfin E1010, STG, and Y (trade names, manufactured by Nissin Chemical Industry Co., Ltd.), Surfynol 61, 104, 82, 465, 485, and TG (trade names, manufactured by Air Products and Chemicals Inc.).

<Saccharide>

In the invention, saccharides may be used alone, but it is preferred to use with the above-described water-soluble symmetrical both-end-type alkanediol. In the combination use of the Gemini-type surfactant as a surfactant and the slightly water-soluble alkanediol, the addition of a saccharide together with the water-soluble symmetrical both-end-type alkanediol can further inhibit occurrence of clogging and curling and improve gloss of a printed matter. The reason thereof is not clear, but it is thought that the improvement in gloss is due to the formation of a coat on the surface of the printed matter by the addition of the saccharide.

Examples of the saccharide used in the ink composition according to the invention include monosaccharides, disaccharides, oligosaccharides (including trisaccharides and tetrasaccharides), polysaccharides, and derivatives thereof. Among them, preferred are glucose, mannose, fructose, ribose, xylose, arabinose, galactose, glucitol, sorbit, maltose, cellobiose, lactose, sucrose, trehalose, maltotriose, filanose, and raffinose. Among them, raffinose is particularly preferred. The addition of raffinose to the ink composition of the invention improves the intermittent printing characteristic. The additive amount of the saccharide may be arbitrarily determined, but is preferably 3 to 18 wt % and more preferably 4 to 8 wt %.

Furthermore, the term polysaccharide refers to a saccharide in the broad sense and includes materials that are widely present in nature, such as alginic acid, α-cyclodextrin, and cellulose. In addition, examples of the derivatives of these saccharides include reducing sugars of the above-mentioned saccharides (for example, sugar alcohol (formula: $HOCH_2(CHOH)_nCH_2OH$ (in the formula, n represents an integer of 2 to 5) and oxidized saccharides (for example, aldonic acid and uronic acid), amino acids, and thiosaccharides. Among them, in particular, sugar alcohol is preferred, and examples thereof include maltitol, sorbitol, and xylitol. These saccharides may be those that are commercially available, and HS20, HS30, and HS500 (manufactured by Hayashibara Shoji Inc.) and Oligo GGF (manufactured Asahi Kasei Chemicals Corp.) can be suitably used.

<Water and Other Components>

The ink composition for ink jet recording according to the invention contains water as a solvent, in addition to the above-described specific slightly water-soluble alkanediol, the specific polyalkylene glycol, the surfactant, and other various additives. The water is preferably pure water or ultrapure water such as ion-exchange water, ultrafiltered water, reverse osmosis water, or distilled water. In particular, the water above is prevented from occurrence of mold and bacteria over a long period of time by being sterilized with ultraviolet irradiation or addition of hydrogen peroxide and is therefore preferred.

Furthermore, the ink composition according to the invention preferably contains a penetrant, in addition to the above-mentioned components.

As the penetrant, glycol ethers can be suitably used.

Examples of the glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol iso-propyl ether, dipropylene glycol mono-n-butyl ether, dipropylene glycol mono-tert-butyl ether, and 1-methyl-1-methoxybutanol. These may be used alone or as a mixture of two or more thereof.

Among the above-mentioned glycol ethers, preferred are polyol alkyl ethers, and particularly preferred are ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, propylene glycol monoethyl ether, propylene glycol monobutyl ether, triethylene glycol monomethyl ether, triethylene glycol monoethyl ether, and triethylene glycol mono-n-butyl ether.

More preferred are triethylene glycol monomethyl ether and triethylene glycol mono-n-butyl ether.

The additive amount of the penetrant may be arbitrarily determined, but is preferably about 0.1 to 30 wt % and more preferably about 1 to 20 wt %.

Furthermore, the ink composition according to the invention preferably contains a recording medium-dissolving agent, in addition to the above-mentioned components.

As the recording medium-dissolving agent, pyrrolidones such as N-methyl-2-pyrrolidone can be suitably used. The additive amount of the recording medium-dissolving agent may be arbitrarily determined, but is preferably about 0.1 to 30 wt % and more preferably about 1 to 20 wt %.

In addition, the ink composition for ink jet recording according to the invention, preferably, does not substantially contain a wetting agent such as glycerin. Since the wetting agent such as glycerin has a function of preventing ink from drying and solidifying in, for example, an ink jet nozzle, the ink does not dry when the ink is dropped on synthetic paper with particularly low ink-absorbing performance, which may be a problem in high-speed printing. Furthermore, in the case of using ink containing a wetting agent, since subsequent ink attaches on a recording medium in the state that the unabsorbed ink is still remaining on the recording medium surface, beading spots may occur. Therefore, in the invention, when such a recording medium having particularly low ink-absorbing performance is used, the wetting agent, preferably, is not substantially contained. Furthermore, even when ink is dried and solidified in an ink jet nozzle, the solidified ink can be re-dissolved by applying a solution containing a wetting agent.

In particular, in the invention, the ink composition, preferably, does not substantially contain a wetting agent having a vapor pressure of 2 mPa or less at 25° C. The term not substantially contain refers to that the additive amount of such a wetting agent is less than 1 wt % with respect to the ink composition.

By controlling the content of the wetting agent having a vapor pressure of 2 mPa or less at 25° C., such as glycerin, to be less than 3 wt % with respect to the ink, printing by an ink jet recording system is possible not only on recording media having low ink-absorbing property, such as printing paper or off-set printing paper, but also on recording media having a particularly low ink-absorbing performance, such as synthetic paper or label paper. Furthermore, by controlling the content of the wetting agent having a vapor pressure of 2 mPa or less at 25° C. to be less than 1 wt % with respect to the ink, printing by an ink jet recording system is possible on metals or plastics that do not absorb ink at all. In addition, it is obvious to those skilled in the art that a part of the above-mentioned penetrative solvent also functions as a wetting agent, but, in the specification, the penetrative solvent is not classified as the wetting agent. Furthermore, in the specification, the slightly water-soluble alkanediol is not classified as the wetting agent.

Examples of the wetting agent include wetting agents that are used in usual ink for ink jet recording and specifically include water-soluble alkanediols having 3 to 5 carbon atoms, such as glycerin, ethylene glycol, 1,3-propanediol, 3-methyl-1,3-butanediol, 1,3-butanediol, and 1,2-pentanediol. When the recording medium has low ink-absorbing performance, as in printing paper or off-set printing paper, the property of recovering from clogging can be controlled by suitably adding these wetting agents. The ink composition of the invention preferably contains from 0.1 to 8 wt % of glycerin as the wetting agent.

The ink composition according to the invention can further contain a nozzle clogging-preventing agent, an antiseptic, an antioxidant, an electroconductivity-controlling agent, a pH adjuster, a viscosity modifier, a surface tension adjuster, and an oxygen absorber, for example.

Examples of the antiseptic/anti-fungal agents include sodium benzoate, sodium pentachlorophenol, sodium 2-pyridinethiol-1-oxide, sodium sorbate, sodium dehydroacetate, and 1,2-dibenzine thiazolin-3-one (Proxel CRL, Proxel BND, Proxel GXL, Proxel XL-2, and Proxel TN, available from ICI Co., Ltd.).

Furthermore, examples of the pH adjuster, a solubilization aid, or the antioxidant include amines such as diethanolamine, triethanolamine, propanolamine, and morpholine and modified products thereof, inorganic salts such as potassium hydroxide, sodium hydroxide, and lithium hydroxide, ammonium hydroxide, quaternary ammonium hydroxide (for example, tetramethyl ammonium), carbonates such as potassium carbonate, sodium carbonate, and lithium carbonate, and phosphates; ureas such as N-methyl-2-pyrrolidone, urea, thiourea, and tetramethylurea, allophanates such as allophanate and methyl allophanate, and biurets such as biuret, dimethyl biuret, and tetramethyl biuret; and L-ascorbic acid and salts thereof.

In addition, the ink composition of the invention may contain an antioxidant and an ultraviolet absorber, and examples thereof include Tinuvin 328, 900, 1130, 384, 292, 123, 144, 622, 770, and 292, Irgacor 252 and 153, and Irganox 1010, 1076, 1035, and MD1024, which are available from Chiba Specialty Chemicals Inc., and oxides of lanthanide.

The ink composition according to the invention can be prepared by dispersing and mixing each component described above by a proper method. Preferably, first, a uniform pigment dispersion is prepared by mixing a pigment, a polymer dispersant, and water with a proper disperser (for example, a ball mill, a sand mill, an attritor, a roll mill, an agitator mill, a Henschel mixer, a colloid mill, an ultrasonic homogenizer, a jet mill, or an angmill). Then, added thereto are a resin (resin emulsion) separately prepared, water, a water-soluble organic solvent, a saccharide, a pH-adjuster, an antiseptic, an anti-fungal agent, and other components, followed by sufficient dissolving to give an ink solution. After sufficient mixing, coarse particles and foreign materials, which cause clogging, are removed by filtration to give a desired ink composition.

Ink Jet Recording Method

An ink jet recording method according to the invention performs printing by discharging droplets of the ink composition described above and letting the droplets attach to a recording medium. In the recording method according to the invention, it is preferable to use synthetic paper or printing paper or off-set printing paper (OKT+: manufactured by Oji Paper Co., Ltd.) as the recording medium. Especially, on art paper, paper for high image quality used in POD (print on demand), and exclusive paper for laser printers, in particular, even in a case of low-resolution printing, a high-quality image free from bleeding and beading can be formed. Examples of the paper for high image quality used in POD include Ricoh business coat gloss 100 (manufactured by Ricoh Company, Ltd.).

In addition, examples of the exclusive paper for laser printers include LPCCTA4 (manufactured by Seiko Epson Corp.).

EXAMPLES

The invention will now be described further in detail with reference to Examples, but the invention is not limited by those examples.

<Preparation of Ink Composition>

Each ink was prepared by mixing each component according to the composition shown in Table 1 below and filtering the mixture through a membrane filter of 10 μm. Here, the oxyethylacrylate-based resin in the Table is a resin having a molecular weight of 6900 and containing about 75 wt %, as a monomer component ratio, of a monomer having a structure of oxyethylene acrylate having CAS No. 72009-86-0.

The fluorene-based resin is a resin having a molecular weight of 3300 and containing about 50 wt %, as a monomer component ratio, of a monomer having a skeleton of fluorene having CAS No. 117344-32-8.

In addition, the surfactant used is a polyorganosiloxane-based surfactant and is composed of a compound represented by the above-mentioned Formula (II) wherein R is a methyl group, a is an integer of 6 to 18, m is an integer of 0, and n is an integer of 1, a compound represented by the above-mentioned Formula (II) wherein R is a hydrogen atom, a is an integer of 7 to 11, m is an integer of 30 to 50, and n is an integer of 3 to 5, and a compound represented by the above-mentioned Formula (II) wherein R is a methyl group, a is an integer of 9 to 13, m is an integer of 2 to 4, and n is an integer of 1 or 2.

TABLE 1

| | Composition | Example 1 Ink set 1 | | | | Example 2 Ink set 2 | | | | Example 3 Ink set 3 | | | |
|---|---|---|---|---|---|---|---|---|---|---|---|---|---|
| | | Y | M | C | K | Y | M | C | K | Y | M | C | K |
| Coloring material | C.I. Pigment Yellow 74 | 7.0 | — | — | — | 7.0 | — | — | — | 7.0 | — | — | — |
| | C.I. Pigment Red 202 | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — |
| | C.I. Pigment Black 7 | — | — | — | 7.0 | — | — | — | 7.0 | — | — | — | 7.0 |
| Dispersant | Oxyethyl acrylate-based resin | 1.4 | 1.4 | 1.4 | 2.8 | 1.4 | 1.4 | 1.4 | 2.8 | 1.4 | 1.4 | 1.4 | 2.8 |
| | Fluorene-based resin | 1.4 | 1.4 | 1.4 | 2.8 | 1.4 | 1.4 | 1.4 | 2.8 | 1.4 | 1.4 | 1.4 | 2.8 |
| Polypropylene glycol 400 | | 4 | 4 | 4 | 4 | 4 | 4 | 4 | 4 | 4 | 4 | 4 | 4 |
| 1,6-Hexanediol | | 0.1 | 0.1 | 0.1 | 0.1 | 1 | 1 | 1 | 1 | 4 | 4 | 4 | 4 |
| 1,2-Octanediol | | 2 | 2 | 2 | 2 | 2 | 2 | 2 | 2 | 2 | 2 | 2 | 2 |
| Surfactant | | 0.3 | 0.3 | 0.3 | 0.3 | 0.3 | 0.3 | 0.3 | 0.3 | 0.3 | 0.3 | 0.3 | 0.3 |
| Pure water | | balance | balance | balance | balance | balance | balance | balance | balance | balance | balance | balance | balance |
| Total | | 100 | 100 | 100 | 100 | 100 | 100 | 100 | 100 | 100 | 100 | 100 | 100 |
| | Composition | Example 4 Ink set 4 | | | | Example 5 Ink set 5 | | | | Example 6 Ink set 6 | | | |
| | | Y | M | C | K | Y | M | C | K | Y | M | C | K |
| Coloring material | C.I. Pigment Yellow 74 | 7.0 | — | — | — | 7.0 | — | — | — | 7.0 | — | — | — |
| | C.I. Pigment Red 202 | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — |
| | C.I. Pigment Black 7 | — | — | — | 7.0 | — | — | — | 7.0 | — | — | — | 7.0 |
| Dispersant | Oxyethyl acrylate-based resin | 1.4 | 1.4 | 1.4 | 2.8 | 1.4 | 1.4 | 1.4 | 2.8 | 1.4 | 1.4 | 1.4 | 2.8 |
| | Fluorene-based resin | 1.4 | 1.4 | 1.4 | 2.8 | 1.4 | 1.4 | 1.4 | 2.8 | 1.4 | 1.4 | 1.4 | 2.8 |
| Polypropylene glycol 400 | | 10 | 10 | 10 | 10 | 10 | 10 | 10 | 10 | 10 | 10 | 10 | 10 |
| 1,6-Hexanediol | | 0.1 | 0.1 | 0.1 | 0.1 | 1 | 1 | 1 | 1 | 4 | 4 | 4 | 4 |
| 1,2-Octanediol | | 2 | 2 | 2 | 2 | 2 | 2 | 2 | 2 | 2 | 2 | 2 | 2 |
| Surfactant | | 0.3 | 0.3 | 0.3 | 0.3 | 0.3 | 0.3 | 0.3 | 0.3 | 0.3 | 0.3 | 0.3 | 0.3 |

TABLE 1-continued

| | | Example 7 Ink set 7 | | | | Example 8 Ink set 8 | | | | Example 9 Ink set 9 | | | |
|---|---|---|---|---|---|---|---|---|---|---|---|---|---|
| Composition | | Y | M | C | K | Y | M | C | K | Y | M | C | K |
| Coloring material | C.I. Pigment Yellow 74 | 7.0 | — | — | — | 7.0 | — | — | — | 7.0 | — | — | — |
| | C.I. Pigment Red 202 | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — |
| | C.I. Pigment Black 7 | — | — | — | 7.0 | — | — | — | 7.0 | — | — | — | 7.0 |
| Dispersant | Oxyethyl acrylate-based resin | 1.4 | 1.4 | 1.4 | 2.8 | 1.4 | 1.4 | 1.4 | 2.8 | 1.4 | 1.4 | 1.4 | 2.8 |
| | Fluorene-based resin | 1.4 | 1.4 | 1.4 | 2.8 | 1.4 | 1.4 | 1.4 | 2.8 | 1.4 | 1.4 | 1.4 | 2.8 |
| Polypropylene glycol 400 | | 4 | 4 | 4 | 4 | 10 | 10 | 10 | 10 | 0 | 0 | 0 | 0 |
| 1,6-Hexanediol | | 0 | 0 | 0 | 0 | 0 | 0 | 0 | 0 | 4 | 4 | 4 | 4 |
| 1,2-Octanediol | | 2 | 2 | 2 | 2 | 2 | 2 | 2 | 2 | 2 | 2 | 2 | 2 |
| Surfactant | | 0.3 | 0.3 | 0.3 | 0.3 | 0.3 | 0.3 | 0.3 | 0.3 | 0.3 | 0.3 | 0.3 | 0.3 |
| Pure water | | balance | balance | balance | balance | balance | balance | balance | balance | balance | balance | balance | balance |
| Total | | 100 | 100 | 100 | 100 | 100 | 100 | 100 | 100 | 100 | 100 | 100 | 100 |

Examples 9 to 16 and Comparative Example 2

Furthermore, ink sets of Examples 9 to 16 and Comparative Example 2 were prepared as in the ink sets of the above-mentioned Examples 1 to 8 and Comparative Example 1 except that the amount of 1,2-octanediol was changed from 2 wt % to 4 wt %.

Examples 17 to 32

Furthermore, ink sets of Examples 17 to 32 were prepared as in the ink sets of the above-mentioned Examples 1 to 16 except that the diol-type polypropylene glycol (weight average molecular weight: 400) (manufactured by Wako Pure Chemical Industries, Ltd.) was changed to diol-type polypropylene glycol (weight average molecular weight: 1000) (manufactured by Wako Pure Chemical Industries, Ltd.).

Examples 33 to 48

Furthermore, ink sets of Examples 33 to 48 were prepared as in the ink sets of the above-mentioned Examples 1 to 16 except that the amount of 1,2-octanediol was changed from 2 wt % or 4 wt % to 1 wt %.

Furthermore, an ink set of Comparative Example 3 was prepared as in the above-mentioned Comparative Example 1 except that the amount of 1,2-octanediol was changed from 2 wt % to 1 wt %.

<Evaluation>

Evaluation (Part 1) of Ink Bleeding (Image Quality) (Bleeding 1)

An ink set composed of the above-prepared ink Y, M, C, and K was installed in the ink cartridge of an ink jet printer (PX-G920, manufactured by Seiko Epson Corp.) so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 7 ng, and a solid image of 720×720 dpi was recorded at 720×360 dpi per one driving on OKT+ of about 128 g/square meter (manufactured by Oji Paper Co., Ltd.). The recording was conducted under environment of low temperature and high humidity (15° C., 65% humidity). On this occasion, the adhesion amount of the ink of a monochromatic color of duty 100% was about 3.6 mg/inch square meter. In addition, the distance between the recording sheet and the recording head was 3 mm.

The recorded image was an image in which 2 to 8 pixel lines of a primary color of duty 60% were in contact with a secondary color of duty 120% of each duty 60%.

The resulting images were evaluated in accordance with the following criteria:

A: 2/720 inch line was reproduced without bleeding;
B: 4/720 inch line was reproduced without bleeding, but 2/720 inch line was not reproduced due to bleeding;
C: 6/720 inch line was reproduced without bleeding, but 4/720 inch line was not reproduced due to bleeding; and
D: 8/720 inch line was not reproduced due to bleeding.

The evaluation results were as shown in Table 2 below.

Evaluation (Part 2) of Ink Bleeding (Image Quality) (Bleeding 2)

An ink set composed of the above-prepared ink Y, M, C, and K was installed in the ink cartridge of an ink jet printer (PX-G920, manufactured by Seiko Epson Corp.) so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 7 ng, and a solid image of 720×720 dpi was recorded at 720×360 dpi per one driving on OKT+ of about 128 g/square meter (manufactured by Oji Paper Co., Ltd.). The recording was conducted under environment of low temperature and high humidity (15° C., 65% humidity). On this occasion, the adhesion amount of the ink of a monochromatic color of duty 100% was about 3.6 mg/inch square meter. In addition, the distance between the recording sheet and the recording head was 3 mm.

The recorded image was an image in which 2 to 8 pixel lines of a primary color of duty 60% were in contact with a tertiary color of duty 180% of each duty 60%.

The resulting images were evaluated in accordance with the following criteria:

A: 2/720 inch line was reproduced without bleeding;

B: 4/720 inch line was reproduced without bleeding, but 2/720 inch line was not reproduced due to bleeding;

C: 6/720 inch line was reproduced without bleeding, but 4/720 inch line was not reproduced due to bleeding; and D: 8/720 inch line was not reproduced due to bleeding.

Evaluation (Part 3) of Ink Bleeding (Image Quality) (Bleeding 3)

An ink set composed of the above-prepared ink Y, M, C, and K was installed in the ink cartridge of an ink jet printer (PX-G920, manufactured by Seiko Epson Corp.) so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image of 720×720 dpi was recorded at 720×360 dpi per one driving on OKT+ of about 128 g/square meter (manufactured by Oji Paper Co., Ltd.). The recording was conducted under environment of low temperature and high humidity (15° C., 65% humidity). On this occasion, the adhesion amount of the ink of a monochromatic color of duty 100% was about 1.6 mg/inch square meter. In addition, the distance between the recording sheet and the recording head was 3 mm.

The recorded image was an image in which 2 to 8 pixel lines of a primary color of duty 60% were in contact with a secondary color of duty 120% of each duty 60%.

The resulting images were evaluated in accordance with the following criteria:

A: 2/720 inch line was reproduced without bleeding;

B: 4/720 inch line was reproduced without bleeding, but 2/720 inch line was not reproduced due to bleeding;

C: 6/720 inch line was reproduced without bleeding, but 4/720 inch line was not reproduced due to bleeding; and D: 8/720 inch line was not reproduced due to bleeding.

The evaluation results were as shown in Table 2 below.

Evaluation (Part 4) of Ink Bleeding (Image Quality) (Bleeding 4)

An ink set composed of the above-prepared ink Y, M, C, and K was installed in the ink cartridge of an ink jet printer (PX-G920, manufactured by Seiko Epson Corp.) so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image of 720×720 dpi was recorded at 720×360 dpi per one driving on OKT+ of about 128 g/square meter (manufactured by Oji Paper Co., Ltd.). The recording was conducted under environment of low temperature and high humidity (15° C., 65% humidity). On this occasion, the adhesion amount of the ink of a monochromatic color of duty 100% was about 1.6 mg/inch square meter. In addition, the distance between the recording sheet and the recording head was 3 mm.

The recorded image was an image in which 2 to 8 pixel lines of a primary color of duty 60% were in contact with a tertiary color of duty 180% of each duty 60%.

The resulting images were evaluated in accordance with the following criteria:

A: 2/720 inch line was reproduced without bleeding;

B: 4/720 inch line was reproduced without bleeding, but 2/720 inch line was not reproduced due to bleeding; and C: 8/720 inch line was not reproduced due to bleeding.

The evaluation results were as shown in Table 2 below.

Evaluation (Part 1) of Ink Beading (Image Quality) (Beading 1)

An ink set composed of the above-prepared ink Y, M, C, and K was installed in the ink cartridge of an ink jet printer (PX-G920, manufactured by Seiko Epson Corp.) so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 7 ng, and a solid image of 720×720 dpi was recorded at 720×360 dpi per one driving on OKT+ of about 128 g/square meter (manufactured by Oji Paper Co., Ltd.). The recording was conducted under environment of low temperature and high humidity (15° C., 65% humidity). On this occasion, the adhesion amount of the ink of a monochromatic color of duty 100% was about 3.6 mg/inch square meter. In addition, the distance between the recording sheet and the recording head was 3 mm.

The recorded image was an image of a secondary color obtained by mixing monochromatic colors of the same duty.

The resulting images were evaluated in accordance with the following criteria:

AA: Up to a secondary color of duty 180% of each monochromatic color of duty 90% was reproduced without beading;

A: Up to a secondary color of duty 160% of each monochromatic color of duty 80% was reproduced without beading;

B: Up to a secondary color of duty 140% of each monochromatic color of duty 70% was reproduced without beading; and C: Up to a secondary color of duty 120% of each monochromatic color of duty 60% was reproduced without beading.

The evaluation results were as shown in Table 2 below.

Evaluation (Part 2) of Ink Beading (Image Quality) (Beading 2)

An ink set composed of the above-prepared ink Y, M, C, and K was installed in the ink cartridge of an ink jet printer (PX-G920, manufactured by Seiko Epson Corp.) so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image of 720×720 dpi was recorded at 720×360 dpi per one driving on OKT+ of about 128 g/square meter (manufactured by Oji Paper Co., Ltd.). The recording was conducted under environment of low temperature and high humidity (15° C., 65% humidity). On this occasion, the adhesion amount of the ink of a monochromatic color of duty 100% was about 1.6 mg/inch square meter. In addition, the distance between the recording sheet and the recording head was 3 mm.

The recorded image was an image of a secondary color obtained by mixing monochromatic colors of the same duty.

The resulting images were evaluated in accordance with the following criteria:

AA: Up to a secondary color of duty 180% of each monochromatic color of duty 90% was reproduced without beading;

A: Up to a secondary color of duty 160% of each monochromatic color of duty 80% was reproduced without beading;

B: Up to a secondary color of duty 140% of each monochromatic color of duty 70% was reproduced without beading; and C: Up to a secondary color of duty 120% of each monochromatic color of duty 60% was reproduced without beading.

The evaluation results were as shown in Table 2 below.

Evaluation of Wiping Durability

The above-described ink cartridge and ink jet printer were used. About 0.25 g of ink of each color was discarded at a time, and then movement in which a wiper wiped the head face was repeated 3000 times. The evaluation was performed under environment of low temperature and high humidity (15° C., 65% humidity).

A: No warping due to wetting occurred; and
B: Warping due to wetting occurred.

The evaluation results were as shown in Table 2 below.

Evaluation of Initial Viscosity of Ink

Each of the above-prepared ink was evaluated for the ink viscosity. The viscosity of ink was measured one hour after the ink preparation with a vibratory viscometer (model no. MV100, manufactured by Yamaichi Electronics Co., Ltd.) and was evaluated by the following criteria. The measurement temperature was 20° C.

A: The viscosity was higher than 3.5 mPa·s and not higher than 4.5 mPa·s;
B: The viscosity was higher than 4.5 mPa·s and not higher than 5.5 mPa·s; and
C: The viscosity was higher than 5.5 mPa·s.

The evaluation results were as shown in Table 2 below.

Evaluation of the Property of Recovering from Clogging

The above-described ink cartridge and ink jet printer were used. After pressing the ink exchange button, the plug was pulled out. At the state that the head cap was removed, the printer was left under environment of a temperature of 50° C. and a humidity of 15% for two days.

After the leaving, cleaning operation was repeated until the discharging by all nozzles is equal to that of the initial stage. The easiness of recovery was evaluated in accordance with the following criteria:

AA: The clogging was reversed by repeating the cleaning operation for three times;
A: The clogging was reversed by repeating the cleaning operation for six times;
B: The clogging was reversed by repeating the cleaning operation for twelve times; and
C: The clogging was not reversed by repeating the cleaning operation for twelve times.

The results were as shown in Table 2 below.

TABLE 2

|  | Beading 1/ Bleeding 1/ Bleeding 2 | Wiping durability | Initial viscosity | Property of recovering from Clogging |
|---|---|---|---|---|
| Example 1 | A/A/B | A | A | B |
| Example 2 | B/A/A | A | A | B |
| Example 3 | B/A/A | A | A | A |
| Example 4 | A/B/B | A | A | AA |
| Example 5 | C/B/B | A | A | AA |
| Example 6 | C/B/B | A | B | AA |
| Example 7 | A/A/C | B | A | B |
| Example 8 | A/B/C | B | A | A |
| Example 9 | AA/A/A | A | A | A |
| Example 10 | A/A/A | A | A | A |
| Example 11 | A/A/A | A | B | A |
| Example 12 | AA/B/A | A | B | AA |
| Example 13 | B/B/A | A | B | AA |

TABLE 2-continued

| Example 14 | B/B/A | A | C | AA |
|---|---|---|---|---|
| Example 15 | AA/A/B | B | A | A |
| Example 16 | AA/B/B | B | B | A |
| Example 17 | A/A/B | A | A | B |
| Example 18 | B/A/A | A | A | B |
| Example 19 | B/A/A | A | A | A |
| Example 20 | A/B/B | B | B | AA |
| Example 21 | C/B/B | A | B | AA |
| Example 22 | C/B/B | A | C | AA |
| Example 23 | A/A/C | B | A | B |
| Example 24 | A/B/C | B | B | A |
| Example 25 | AA/A/A | A | B | A |
| Example 26 | A/A/A | A | B | A |
| Example 27 | A/A/A | A | B | A |
| Example 28 | AA/B/A | B | C | AA |
| Example 29 | B/B/A | B | C | AA |
| Example 30 | B/B/A | A | C | AA |
| Example 31 | AA/A/B | B | B | A |
| Example 32 | AA/B/B | B | C | A |
| Example 33 | B/B/C | A | A | B |
| Example 34 | C/B/B | A | A | B |
| Example 35 | C/B/B | A | A | A |
| Example 36 | B/C/C | A | A | AA |
| Example 37 | D/C/C | A | A | AA |
| Example 38 | D/C/C | A | A | AA |
| Example 39 | B/B/D | A | A | B |
| Example 40 | B/C/D | A | A | A |
| Example 41 | A/B/B | A | A | A |
| Example 42 | B/B/B | A | A | A |
| Example 43 | B/B/B | A | A | A |
| Example 44 | A/C/B | A | A | AA |
| Example 45 | C/C/B | A | A | AA |
| Example 46 | C/C/B | A | B | AA |
| Example 47 | A/B/C | A | A | A |
| Example 48 | A/C/C | A | A | A |
| Comparative Example 1 | C/A/A | A | A | C |
| Comparative Example 2 | B/A/A | B | A | B |
| Comparative Example 3 | D/D/D | B | A | B |

|  | Beading 2/ Bleeding 3/ Bleeding 4 |
|---|---|
| Example 33 | A/A/B |
| Example 34 | B/A/B |
| Example 35 | B/A/A |
| Example 36 | A/B/B |
| Example 37 | C/B/B |
| Example 38 | C/B/B |
| Example 39 | A/A/C |
| Example 40 | A/B/C |
| Example 41 | AA/A/A |
| Example 42 | A/A/A |
| Example 43 | A/A/A |
| Example 44 | AA/B/A |
| Example 45 | B/B/A |
| Example 46 | B/B/A |
| Example 47 | AA/A/B |
| Example 48 | AA/B/B |
| Comparative Example 3 | C/C/C |

What is claimed is:

1. An ink composition for ink jet recording, comprising at least a coloring material, water, a slightly water-soluble alkanediol, and a polyalkylene glycol, wherein the content ratio of the slightly water-soluble alkanediol and the polyalkylene glycol is 1:1 to 1:10.

2. The ink composition according to claim 1, wherein the slightly water-soluble alkanediol is an alkanediol having 7 or more carbon atoms.

3. The ink composition according to claim 1, wherein the polyalkylene glycol is a polypropylene glycol.

4. The ink composition according to claim 1, wherein the sum of the contents of the slightly water-soluble alkanediol and the polyalkylene glycol is 14 wt % or less based on the amount of the ink composition.

5. The ink composition according to claim 1, wherein the amount of the slightly water-soluble alkanediol is from 1 to 4 wt % based on the amount of the ink composition.

6. The ink composition according to claim 1, wherein the amount of the polyalkylene glycol is from 4 to 10 wt % based on the amount of the ink composition.

7. The ink composition according to claim 1, wherein the slightly water-soluble alkanediol is 1,2-octanediol.

8. The ink composition according to claim 1, wherein the polypropylene glycol is a diol.

9. The ink composition according to claim 1, wherein the polypropylene glycol has a weight average molecular weight of 400 to 700.

10. The ink composition according to claim 1, further comprising a polyol alkyl ether.

11. The ink composition according to claim 10, wherein the polyol alkyl ether is an alkylene glycol methyl ether.

12. The ink composition according to claim 10, wherein the polyol alkyl ether is triethylene glycol monomethyl ether.

13. The ink composition according to claim 1, further comprising a surfactant.

14. The ink composition according to claim 13, wherein the surfactant is a polyorganosiloxane-based surfactant or a Gemini surfactant.

15. An ink composition for ink jet recording, comprising at least a coloring material, water, a slightly water-soluble alkanediol, and a polyalkylene glycol wherein the content ratio of the slightly water-soluble alkanediol and the polyalkylene glycol is 1:1 to 1:10 the ink composition further comprising a water-soluble symmetrical alkanediol having a hydroxy group at both ends, wherein the content ratio of the water-soluble symmetrical alkanediol and the slightly water-soluble alkanediol is 1:80 to 4:1.

16. The ink composition according to claim 15, wherein the water-soluble symmetrical alkanediol is an alkanediol having 3 or more carbon atoms.

17. The ink composition according to claim 15, wherein the content ratio of the water-soluble symmetrical alkanediol and the polyalkylene glycol is 1:1 to 1:100.

18. The ink composition according to claim 15, wherein the sum of the contents of the water-soluble symmetrical alkanediol, the slightly water-soluble alkanediol, and the polyalkylene glycol is 18 wt % or less based on the amount of the ink composition.

19. The ink composition according to claim 15, wherein the amount of the water-soluble symmetrical alkanediol is from 0.1 to 4 wt % based on the amount of the ink composition.

20. The ink composition according to claim 15, wherein the water-soluble symmetrical alkanediol has a branched chain.

21. The ink composition according to claim 15, wherein the water-soluble symmetrical alkanediol is one or two or more selected from the group consisting of 2-methyl-1,3-propanediol, 3-methyl-1,5-pentanediol, 1,5-pentanediol, and 1,6-hexanediol.

22. An ink composition for ink jet recording, comprising a coloring material, water, a slightly water-soluble alkanediol, a polyalkylene glycol and a water-soluble symmetrical alkanediol having a hydroxyl group at both ends, wherein the slightly water-soluble alkanediol is present in the ink composition in an amount between 1 to 4 wt %, the polyalkylene glycol is present in the ink composition in an amount between 4 to 10 wt % and the water-soluble symmetrical alkanediol is present in the ink composition in an amount between 0.1 to 4 wt %, wherein a content ratio of the slightly water-soluble alkanediol and the polyalkylene glycol in the ink composition is 1:1 to 1:10, a content ratio of the water-soluble symmetrical alkanediol and the slightly water-soluble alkanediol in the ink composition is 1:80 to 4:1 and a content ratio of the water-soluble symmetrical alkanediol and the polyalkylene glycol is 1:1 to 1:100, and wherein the polyalkylene glycol has a weight average molecular weight of 2000 or less.

23. The ink composition according to claim 22, wherein the polyalkylene glycol has a weight average molecular weight of 400 to 700, and the sum of the amounts of the water-soluble symmetrical alkanediol, the slightly water-soluble alkanediol and the polyalkylene glycol is at most 18 wt % of the ink composition.

* * * * *